Nov. 11, 1930.     C. H. LAND     1,781,399
TRACTOR TRAILER
Filed June 21, 1929     4 Sheets-Sheet 1
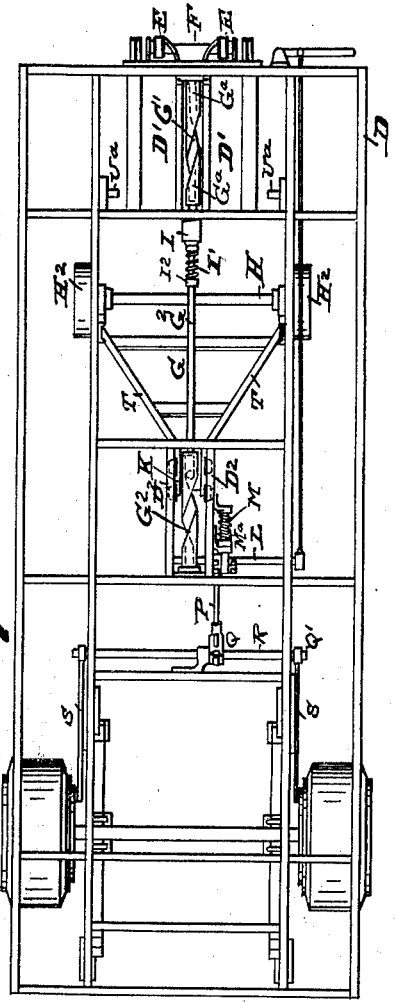
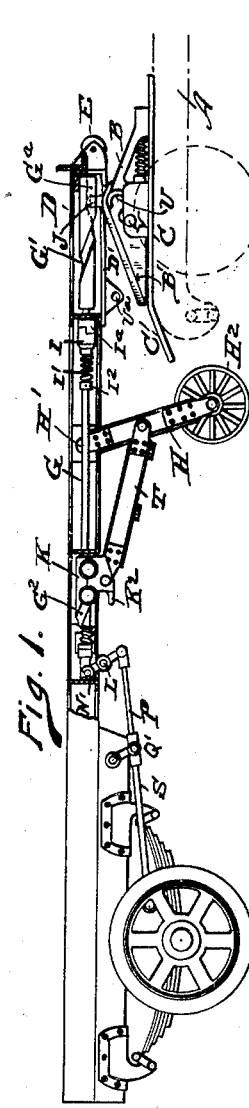
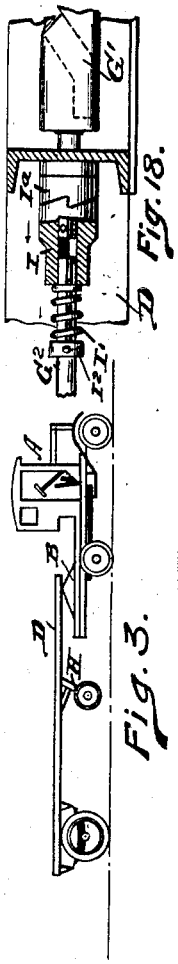
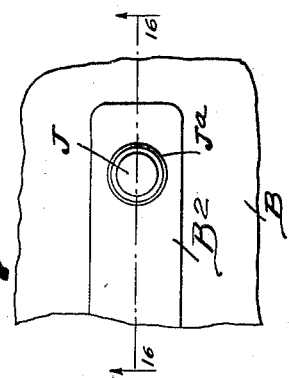
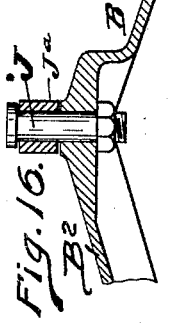
Charles H. Land
INVENTOR
BY S. E. Thomas
ATTORNEY

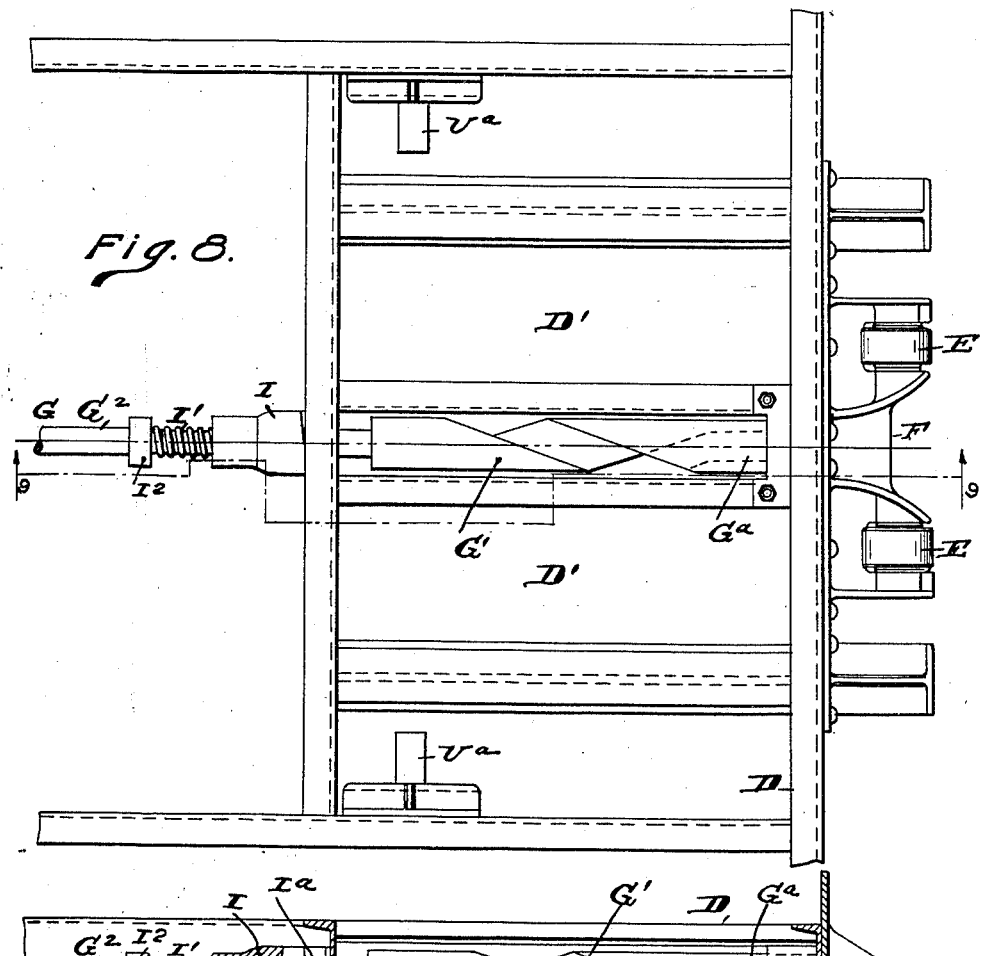
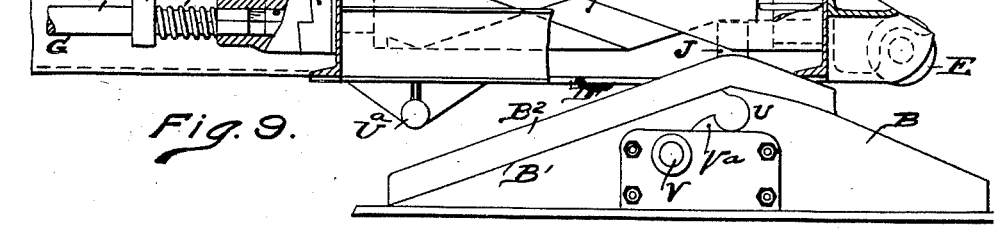
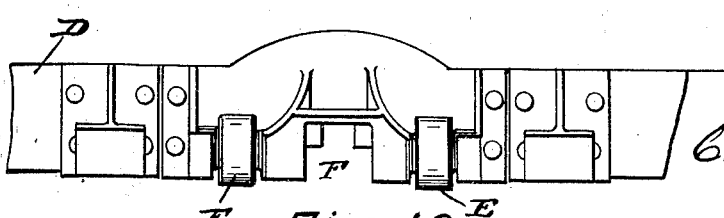

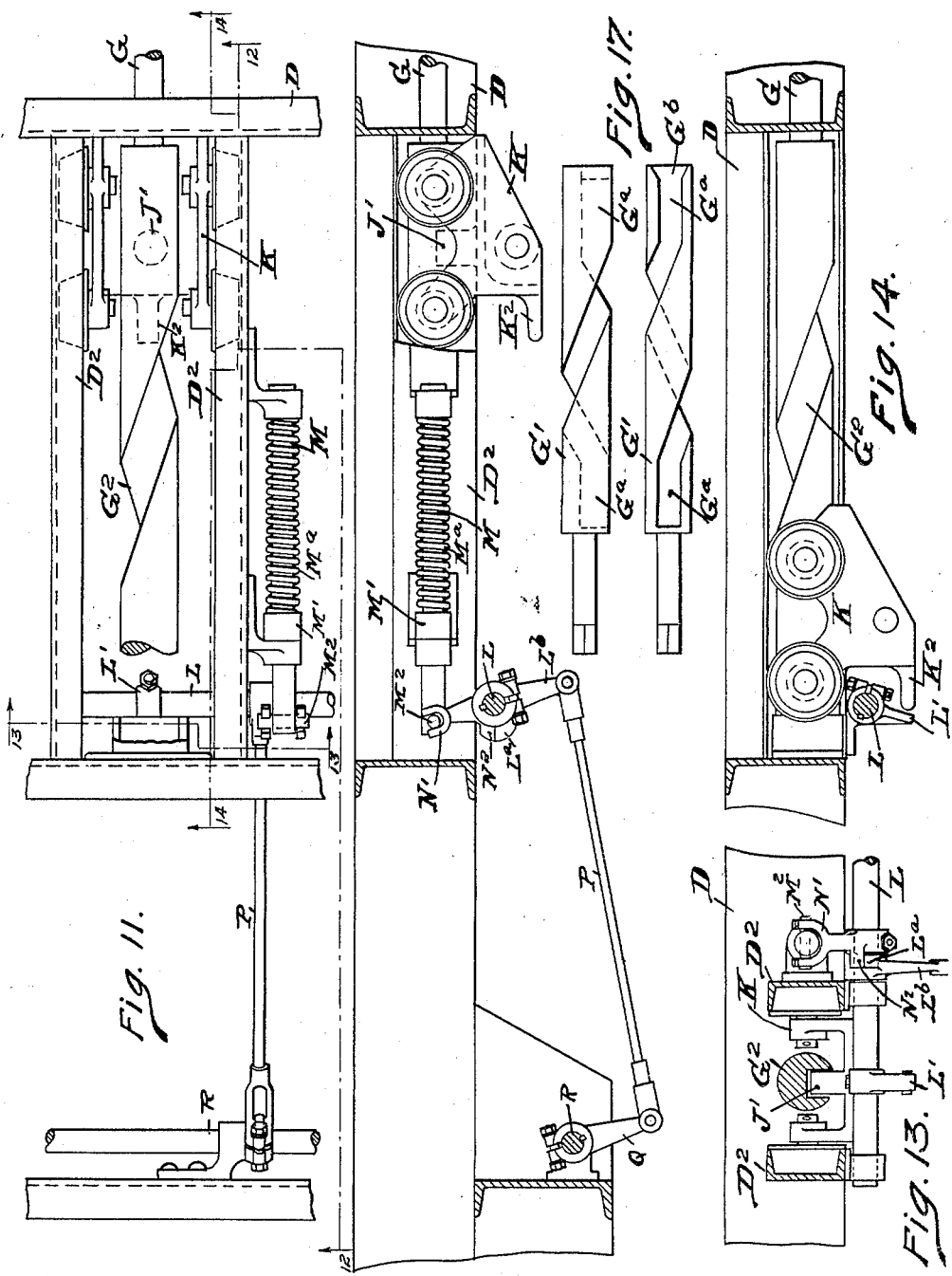

Patented Nov. 11, 1930

1,781,399

UNITED STATES PATENT OFFICE

CHARLES H. LAND, OF DETROIT, MICHIGAN

TRACTOR TRAILER

Application filed June 21, 1929. Serial No. 372,699.

My invention relates to tractor-trailers and more particularly to improvements on the devices shown in my U. S. Patent No. 1,686,698 and co-pending applications Serial No. 312,992, filed October 17, 1929, and Serial No. 333,694, filed January 19, 1929, for tractor-trailers, in which a divided longitudinal helical shaft journaled on the trailer is rotated upon backing the tractor into the trailer to effect the coupling of the tractor and trailer together and thereby causing the shaft to automatically actuate certain mechanism controlling the raising of a supporting leg at the forward end of the trailer, whereby the trailer may be hauled by the tractor,—the leg being automatically lowered to support the forward end of the trailer, upon releasing the tractor from the trailer.

In the present and co-pending applications, the divided longitudinal helical shaft is provided with a spring actuated clutch mechanism, whereby the rear end of the helical shaft,—controlling the operation of the supporting leg,—cannot be rotated until the coupling of the tractor and trailer has been effected. The lower fifth wheel member is provided with skids to receive the elevating wheels carried by the trailer whereby the trailer may be raised to a coupling position by the backward movement of the tractor,—there is also a turn-table, draft mechanism, and locks to hold the tractor and trailer together in transit and as these several features have been shown and described in the applications now on file, it is considered unnecessary to again enter into a detailed description and showing of the same in this application except so far as may be necessary to describe and illustrate the instant invention.

The primary object of the present invention is to provide the fifth wheel mechanism carried by the tractor with a driving pin, which upon backing the tractor into the trailer is adapted to enter a flaring throat in the helical groove of the divided longitudinal shaft, to rotate the shaft and thereby actuate the mechanism employed to raise and lower the supporting leg of the trailer.

A further object of the invention is to construct the divided longitudinal shaft with a relatively short straight channel running parallel with the axis of the shaft, connecting the helical groove with the flaring throat at the end of the shaft so that a coordinating relation may be first establised between the tractor and trailer before the pin through a further backing of the tractor enters the helical groove in the shaft and thereby shifts the latter longitudinally to release the clutch mechanism controlling the rotation of that portion of the longitudinal shaft governing the raising and lowering of the supporting leg. The driving pin when the tractor is about to be uncoupled from the trailer again enters the straight grooved portion of the longitudinal shaft, permitting the clutch mechanism to automatically lock the shaft controlling the operation of the supporting leg mechanism before releasing the tractor from the trailer.

The straight channel portion connected with the helical groove also serves to insure against a forced or accidental discharge of the pin from the shaft, occasioned by the rotative resistance the shaft would initially offer the driving pin upon entering its helical groove.

A further object of the invention is to provide the driving pin,—carried by the fifth wheel of the tractor,—with a sleeve, whereby it may have a rolling driving contact with the side walls of the helical groove of the longitudinal shaft of the trailer.

Another object of the invention is a simple and effective means for automatically releasing the spring-set brake mechanism through the operation of the helical-shaft, when backing the tractor into the latter to effect a coupling relation.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a diagrammatic side elevation of a trailer showing its forward end partly in section and mounted upon the inclined fifth wheel of a tractor,—a fragmentary portion of which is shown in dotted lines.

Figure 2 is a diagrammatic plan view of the trailer.

Figure 3 is a diagrammatic side elevation of the tractor-trailer combination,—coupled together as in transit.

Figure 8 is a plan view of the forward end of the tractor, showing a portion of the longitudinal helical shaft.

Figure 9 is a longitudinal vertical sectional view of the forward end of the trailer, taken on or about line 9—9 of Figure 8, showing the driving pin (in dotted lines) carried by the fifth wheel of the tractor as it would appear when entering the groove of the longitudinal helical shaft of the trailer to drive the latter.

Figure 10 is a fragmentary end elevation of the trailer showing the channel in the throat of the casting to receive the guide-wedge of the fifth wheel carried by the tractor.

Figure 11 is a fragmentary plan view of a detail showing the rear end of the helical shaft and means for releasing the spring-set brakes,—following the raising of the supporting leg carried by the trailer.

Figure 12 is a fragmentary side elevation with parts broken away and in section taken on or about line 12—12 of Figure 11.

Figure 13 is a fragmentary cross-sectional elevation, taken on or about line 13—13 of Figure 11.

Figure 14 is a fragmentary side elevation and longitudinal section, taken on or about line 14—14 of Figure 11, showing means carried by the leg raising and lowering mechanism in position for releasing the spring-set brake mechanism.

Figure 15 is a fragmentary plan view of a portion of the fifth-wheel member carried by the tractor, showing a modification of the driving pin, for actuating the longitudinal helical shaft carried by the trailer.

Figure 16 is a vertical longitudinal sectional view taken on or about line 16—16 of Figure 15, showing a roller mounted on the driving pin.

Figure 4:
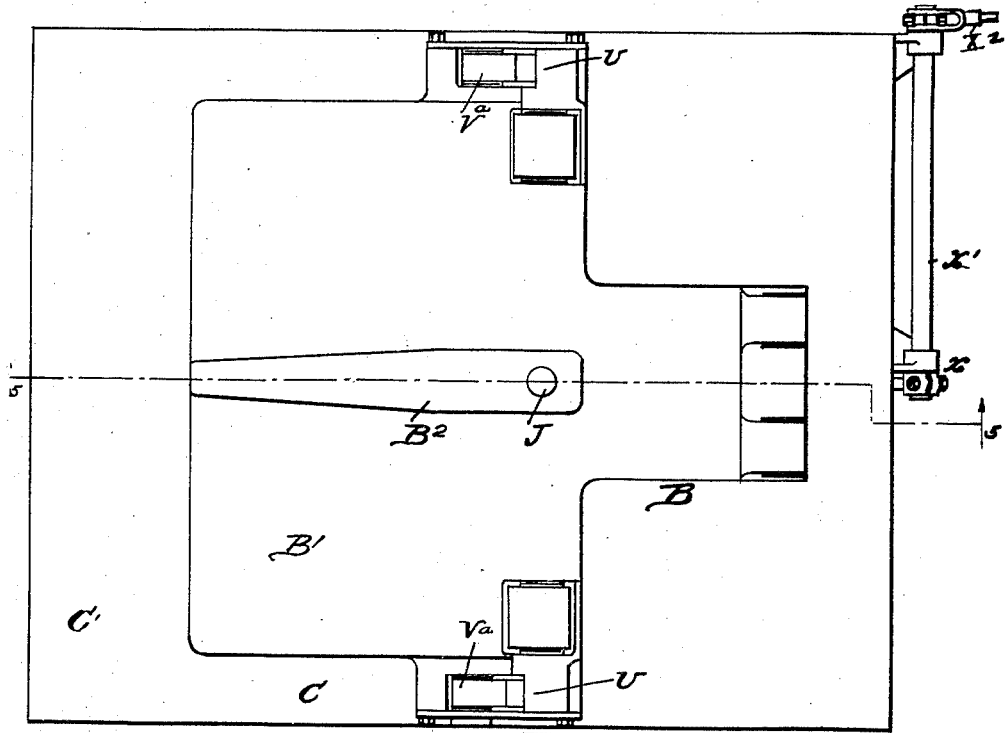
Figure 4 is a plan view of the lower fifth wheel member attached to the plate of the tractor.

Figure 17 comprises respectively a side and an inverted plan view of the longitudinal helical shaft of the trailer,—disclosing more particularly the straight throat at the forward end of the shaft to receive the driving pin of the tractor, before entering the connecting helical groove to rotate the shaft.

Figure 18 is a longitudinal sectional elevation of a detail of the clutch, showing the squared end of the divided longitudinal shaft on which the clutch is slidably mounted.

Referring now to the letters of reference placed upon the drawings:

The tractor A is provided with a fifth wheel B having an inclined skid-face $B^1$ registering with the inclined face $C^1$ of the platform C so that when backed under a trailer D, the elevating rollers E of the trailer may ascend the skid $C^1$ and the inclined face of the fifth wheel.

The fifth wheel B carried by the tractor has an upstanding guide-wedge or pilot $B^2$ on its face which upon backing into the trailer enters the flared throat F of the skid-casting at the front end of the trailer and is guided by the walls of the channel until the relatively heavy plates $D^1$, $D^1$,—spaced apart and bolted to the frame adjacent the longitudinal axis of the trailer, come in contact with the apex of the fifth wheel. The inclined pilot or guide-wedge $B^2$ tapers at its lower end to allow angularity of coupling but toward its upper end, its sides are aparallel,— the pilot being at the top approximately the width of the channel, thus insuring proper coupling action between the interlocking elements.

The trailer is provided with a longitudinal rotatable shaft G which actuates a movable element H for supporting its forward end. The shaft G is journaled in suitable bearings attached to the frame of the trailer and consists of two sections having a helix $G^1$ at the forward end and a helix $G^2$ at the rear end. The section including the helix $G^1$ has a squared end fitted and pinned to a clutch casting I. This section of the clutch casting supports the squared end of the shaft $G^2$ and is so arranged that it can slide on it for a short distance against the action of a spring $I^1$, abutting against a collar $I^2$, pinned to the shaft. Clutch member $I^a$, which may be an integral part of one of the shaft bearings, is rigidly attached to the frame of the trailer.

The helix $G^1$ in the forward section of the longitudinal shaft is connected with a relatively short straight channel groove $G^a$, at each end thereof, parallel with the axis of the shaft, with a flaring throat $G^b$ at its forward end, opening into the straight channel groove, to receive a driving pin or stub shaft J, projecting upwardly from the pilot $B^2$, of the fifth wheel member B;—the shaft being rotated thereby when the tractor is backed under the trailer, or when driven forwardly for the purpose of disconnecting the tractor from the trailer.

The helix $G^2$ at the rear end of the longitudinal shaft receives the projecting pin $J^1$ of a trolley carriage K,—supported by the flanges of a pair of channel-irons $D^2$, $D^2$, bolted to the frame of the trailer D.

Journaled in bearings bolted to the channel irons $D^2$, $D^2$ is a rock-shaft L fitted with a rocker arm $L^1$ adapted to receive the thrust of a finger $K^2$ projecting from the trolley carriage $K^1$, see Figures 12 and 14.

Supported by brackets bolted to one of the channel irons $D^2$ is a rod M, on which is sleeved a spring $M^a$ bearing at one end against one of the brackets and at the other against a collar $M^1$ secured to the rod to normally maintain the brakes of the trailer "set" until automatically released upon coupling the tractor to the trailer. $M^2$ is a pin extending transversely through the rod at one end, engaged by a yoke-shaped rocker arm $N^1$ secured to the rock-shaft L, having a projecting heel $N^2$ bearing against the heel $L^a$ of a rock-arm $L^b$ loosely mounted upon the shaft L, whereby the brake mechanism may be released as will be hereafter explained.

P denotes a link bar connecting the rock-arm $L^b$ with a rocker-arm Q, keyed to a shaft R journaled in bearings secured to one of the transverse members of the trailer frame, and S, S indicate brake rods connected with rocker arms $Q^1$ for controlling the operation of the brake mechanism—diagrammatically indicated in Figure 1.

The movable supporting element H pivoted at $H^1$ to the side sills of the trailer for supporting the forward end of the latter is fitted at its lower end with wheels $H^2$. T are link-bars connecting the movable supporting element with the frame of the trolley carriage K.

The driving pin or stub shaft J projecting upwardly from the pilot $B^2$, carried by the fifth wheel member B may be fitted with a rotatable sleeve $J^a$—see Figures 15 and 16—to provide a rolling contact between the pin and the walls of the helical groove.

Figure 5:
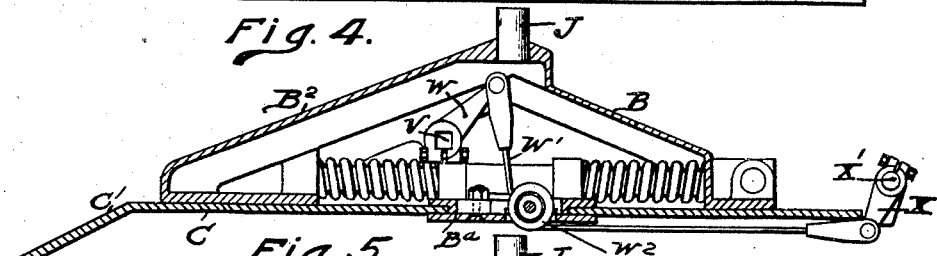
Figure 5 is a longitudinal vertical sectional view taken on or about line 5—5 of Figure 4, of the tractor portion of the fifth wheel member, showing a driving pin at the apex of the fifth wheel member for actuating the longitudinal helical shaft of the trailer, upon backing the tractor into the trailer,—or when releasing the tractor from the trailer.
Figure 6:
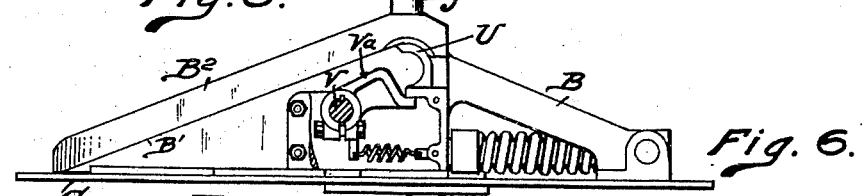
Figure 6 is a side elevation of the tractor portion of the fifth wheel member, showing its draft mechanism and lock controlling device.

The tractor member B of the fifth wheel, bears upon a plate or platform—see Figures 5 and 6—and is horizontally turnable and slidable on same.

The plate is held in turnable contact with the platform by an annular ring $B^a$ which projects through and has overlapping lips bearing upon the platform to prevent displacement. These features are fully shown and described in the co-pending application Serial No. 333,694.

Arc-shaped stops U are provided on the tractor member B, to seat lock pins $U^a$ secured to the frame of the trailer—see Figures 1, 2, 4 and 6.

Keyed to a rock-shaft V journaled in the frame of the tractor member B are two spring actuated latches $V^a$, $V^a$ coordinating with the arc-shape stops U to receive and secure the lock pins $U^a$, $U^a$. The latches $V^a$, $V^a$ are depressed by the lock pins $U^a$, $U^a$ as the tractor is backed into coupling relation with the trailer;—the lock-pins being held by the latches, when the pins contact with the arc-shaped stops U.

Attached to the rock-shaft V is an arm W to which is secured a cable $W^1$,—guided by a pulley $W^2$,—connected with a rocker arm X secured to a rock-shaft $X^1$, journaled in the end of the tractor platform. Secured to the rock-shaft $X^1$ is a rocker arm $X^2$ to which is attached a cable or rod leading to a controlling lever,—not shown— in the tractor cab.

Having indicated now the various parts, I will explain the operation of the device, which first consists in backing the tractor into the trailer, whereupon the elevating wheels E come in contact with the skids $C^1$ on the inclined face of the fifth wheel, and the plates $D^1$, $D^1$ slide upon the apex of the lower fifth wheel element, to the completion of the leg lifting operation and final coupling;—the apex serving as a rocking surface while the vehicle is in transit.

Upon backing the tractor into the trailer, the driving pin J projecting upwardly from the pilot $B^2$ enters the flaring throat $G^b$ at the forward end of the longitudinal shaft G passing into the straight channel groove parallel with the axis of the shaft.

The tractor is now aligned with the trailer but continuing its backing operation, the driving pin J enters the helical groove which due to the angularity of the groove forces backwardly the forward section of the longitudinal shaft a sufficient distance to disengage the clutch member I, secured to the shaft, from the clutch member $I^a$ rigidly attached to the frame of the trailer. The front and rear sections of the helical shaft then rotate as a unit. The tractor continuing to back under the trailer, the helix $G^2$ at rear end of the longitudinal shaft,—into which the pin $J^1$ of the trolley carriage projects—drives the carriage rearwardly upon the flanges of the channel irons $D^2$, $D^2$, thereby raising the supporting element H, pivoted to the frame of the trailer and linked to the trolley carriage. The tractor in backing under the trailer forces the finger $K^2$,—projecting from the trolley carriage K,—against the rocker arm $L^1$ of the rock shaft L, thereby releasing the spring set brake mechanism.

Concurrently with the release of the spring set-brake mechanism, the arc-shape stops U, U receive the lock pins U$^a$, U$^a$, which upon entering into the stops, depress the spring actuated latches V$^a$, V$^a$,—the latches immediately springing back to their normal position, to secure the lock-pins U$^a$, U$^a$ against disengagement, until manually released by a controlling lever in the cab of the tractor—not shown—connected with the cable W$^1$ and with the rocker arm X.

The driving pin J, projecting upwardly from the pilot B$^2$, having passed from the forward helical section of the longitudinal shaft, enters the straight channel connected with the helical groove and parallel with the axis of the shaft, thereby arresting further rotation of the shaft and permitting the driving pin to rock in the groove when in transit in coupled relation.

The tractor and trailer being now coupled together, the unit is ready for transit.

Figure 7:
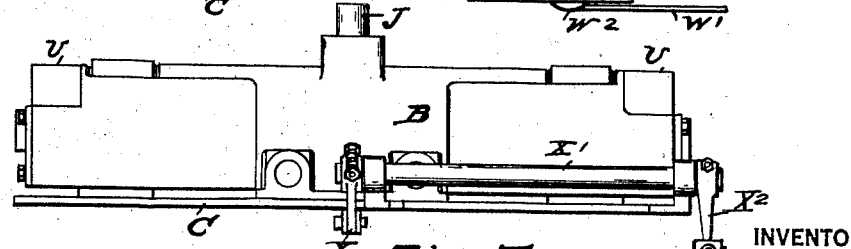
Figure 7 is an end elevation of the fifth wheel member attached to the tractor.

To uncouple, a controlling lever—not shown—in the cab is operated to pull the cable W$^1$ connected with the rocker arm X,—see Figures 4 and 7—thereby drepressing the spring latches V$^a$, V$^a$ to release the lock pins U$^a$, U$^a$. The tractor is then driven in a forward direction,—whereupon the driving pin J rotates the helical shaft lowering the supporting leg, which is again locked by the spring clutch member engaging its fixed member, thus securing the leg of the trailer when lowered against collapse. The tractor being now disconnected, the brakes are again "spring set" as before.

Having thus described my invention, what I claim is:

1. In combination with a tractor-trailer, a rotatable shaft journaled in the frame of the trailer and extending longitudinally thereof; a supporting element for the trailer, adapted to be moved into supporting or non-supporting position by the rotation of said shaft; and a pin carried by the tractor adapted to cooperate directly with a helical groove in the shaft to effect its rotation through a backward or forward movement of the tractor.

2. In combination with a tractor-trailer, a longitudinally rotatable helically grooved shaft journaled in the frame of the trailer; a supporting element for the trailer adapted to be moved into supporting or non-supporting position by the rotation of said shaft; means for automatically releasing and locking said shaft when the supporting element is respectively raised and lowered; and a driving pin, carried by the tractor adapted to enter the helical groove of the shaft to effect its rotation by a backward or forward movement of the tractor during the coupling and uncoupling operation of the tractor and trailer.

3. A structure as specified in claim 2 in which the front end of the longitudinal shaft is formed with a flaring throat, whereby said driving pin may readily enter the groove in said shaft.

4. A structure as specified in claim 2 in which the helical groove at the forward end of the longitudinal shaft connects with a relatively short straight groove parallel with the axis of the shaft, substantially as and for the purpose described.

5. In combination with a tractor-trailer, a rotatable longitudinal helical shaft journaled in the frame of the trailer; a supporting element for the trailer adapted to be moved into supporting or non-supporting position by the rotation of said shaft; a fifth wheel having permanently inclined faces carried by the tractor; means for coupling the tractor to the trailer; a pin projecting upwardly from the apex of the fifth wheel member, adapted to enter the helical groove of the longitudinal shaft, whereby the shaft may be rotated only by the backward and forward movement of the tractor during the coupling and uncoupling operations of the tractor and trailer.

6. In combination with a tractor-trailer, means for supporting the forward end of the trailer, adapted to be moved into and out of action; a divided longitudinally disposed helical shaft journaled in the trailer, one portion of the shaft being slidable in its bearings and having a driving telescopic connection with the other portion of the shaft; a clutch adapted to secure said shaft against rotation; means for operatively connecting the trailer supporting means with one section of the rotatable shaft, whereby it may be brought into or out of action by the rotation of the shaft; a driving pin carried by the tractor adapted to enter the helical groove of the shaft, whereby the shaft may be shifted longitudinally to release the clutch and also to effect the rotation of the shaft only through a backward and forward movement of the tractor during the coupling and uncoupling operation of the tractor and trailer.

7. In a tractor-trailer combination of the character described, wherein the forward end of the trailer is adapted to be coupled to the rear end of the tractor in superposed relation to the latter; a fifth wheel adapted to effect the coupling relation, comprising lower and upper members respectively attached to the tractor and trailer, said lower fifth wheel member embodying permanent, upwardly inclined opposing surfaces; a longitudinally disposed helical shaft journaled in the trailer; a movable supporting leg for the trailer; and a driving pin projecting from the apex of the lower fifth wheel member adapted to enter the helical groove of the longitudinal shaft to raise and lower the supporting leg by a backward or forward movement of the tractor during the coupling and uncoupling operation.

8. In combination with a tractor-trailer, a rotatable helical shaft journaled in the frame of the trailer and extending longitudinally thereof; a supporting element for the trailer adapted to be moved into supporting or non-supporting position by the rotation of said shaft; a spring clutch mechanism, adapted to automatically lock and release said shaft when the supporting element is raised and lowered; a spring actuated normally set brake mechanism for the trailer; means actuated by a longitudinal translation of said helical shaft, respectively adapted to release the brake and the clutch mechanism; and a driving pin carried by the tractor adapted to enter the helical groove of the shaft to effect its rotation and the longitudinal movement of said shaft upon coupling and uncoupling the tractor and trailer by a forward and backward movement of the tractor.

9. In combination with a tractor-trailer, a divided longitudinally rotatable helically grooved shaft journaled in the frame of the trailer, a normally set spring actuated brake mechanism for the wheels of the trailer; a movable supporting element for the front of the trailer; a spring actuated clutch mechanism adapted to secure said shaft against rotation; a driving pin carried by the tractor adapted to enter one of the helical grooves of the shaft to release the clutch mechanism and to rotate the shaft during the coupling and uncoupling operation; a trolley carriage supported by the frame of the trailer fitted with means adapted to release the spring actuated brake mechanism upon contacting therewith; means connecting the trolley carriage with the movable supporting element for raising and lowering the latter; a pin carried by the trolley carriage adapted to extend into the other helical groove of the shaft, whereby the trolley carriage may be actuated through the rotation of the shaft due to the forward and backward movement of the tractor, to release the brake mechanism and to raise and lower the supporting element for the trailer.

10. A structure as specified in claim 2 in which the helical groove at the forward end of the longitudinal shaft connects with a relatively short straight groove parallel with the axis of the shaft at the forward and rear ends of said helical groove.

In testimony whereof, I sign this specification.

CHARLES H. LAND.